United States Patent Office.

OSCAR S. FOLLETT, OF NEW YORK, N. Y.

Letters Patent No. 105,560, dated July 19, 1870; antedated July 8, 1870.

IMPROVEMENT IN PRESERVING AND BEAUTIFYING CRYSTALLIZED SALTS UPON GLASS, MICA, &c.

The Schedule referred to in these Letters Patent and making part of the same.

To all whom it may concern:

Be it known that I, OSCAR S. FOLLETT, of the city, county, and State of New York, have invented a new, useful, and improved Method of Preserving and Beautifying Salts when Crystallized from their Solutions upon Glass or Mica.

It is well known that by dissolving sulphate of magnesia (epsom salts) in water, the solution will, upon being applied to the surface of a sheet of glass, deposit, upon evaporation of the water, crystals of varied and exceeding beauty, which, by transmitted light, have much the appearance of frosted glass. Other salts, upon being treated in the same manner, will deposit crystals varying in form according to the peculiar crystallizing qualities of the salts used. In this state the crystals so formed are very delicate, the slightest touch obliterating them, and the action of the air causing them to effloresce or deliquesce, according to the nature of the salt used.

Varnishing has been tried as a means of protecting crystals so formed, but with only partial success, as the surface becomes dull and defaced by use.

The object of my invention is to preserve and protect from the action of the elements, also from defacement by use, crystallized surfaces upon glass or mica; and I do hereby declare that the following is a full, clear, and exact description thereof, which will enable others skilled in the art to make and use the same.

To preserve and beautify crystallized surfaces upon glass or mica, I take another sheet of glass or mica, of the same size as that upon which the crystals are formed, clean it, and either upon it or upon the crystallized surface of the other glass I pour a small quantity of Canada balsam, or any suitable transparent adhesive varnish or mixture, and, placing the two surfaces in contact, press them gently together. By this means the varnish spreads evenly over the surfaces both of the glass or mica upon which the crystals are formed, and over the surface of the duplicate sheet of plain glass or mica, hermetically sealing them together, thus confining the crystallized salts between two sheets of glass or mica, accordingly as they may be used, and effectually protecting them from the action of the elements or from defacement by use.

I give color to the crystals by varnishing in any convenient manner, with colored varnish or its equivalent, either sheet of glass or mica used, either coloring one sheet before crystallizing upon it, or, by coloring the plain sheet of glass or mica to which the crystallized surface is to be sealed, or by coloring both before sealing them together.

By coloring one of the sheets of glass or mica with one color before crystallizing upon it, and the duplicate sheet of glass or mica to which the crystallized surface is to be sealed of another color, they will, when sealed together, combine in giving a color unattainable by any single color alone.

The varnished surfaces, being hermetically sealed together in the same manner and at the same time as the crystallized salts are, are effectually protected from the action of the elements and from defacement by use.

Designs or lettering may be traced, painted, etched, gilded, or in any suitable way may be sketched upon either sheet of glass or mica, either before crystallizing upon one of the sheets of glass or mica, or upon the duplicate sheet of glass or mica before sealing them together, and in this way beautifully-ornamented sheets may be made, filled in with crystals of a different color from that with which the design is made.

In this way crystallizations of the most delicate nature, varied and beautiful in the extreme in their matchless formation, may be protected and preserved and used, with infinite variety and effect, in place of ground, stained, or colored glass, for ornamental and illuminating purposes, with the advantage of possessing within itself a style of beauty exquisite in detail in its formation of figures and minuteness of design, unapproachable by the skill or ingenuity of man.

Having thus described my invention,

What I claim as new, and desire to secure by Letters Patent, is—

1. As a new article of manufacture, hermetically-sealed crystallized salts, sealed between two sheets of plain, colored, or ornamented glass or mica, for the purposes and in the manner substantially as herein described.

2. Hermetically sealing crystallized salts between two sheets of plain, colored, or ornamented glass or mica, for the purposes as set forth and in the manner substantially as described.

OSCAR S. FOLLETT.

Witnesses:
HENRY M. JOHNSTON,
DAVID EARLE.